United States Patent [19]

Mulier

[11] 3,713,449

[45] Jan. 30, 1973

[54] CARDIAC PACER WITH EXTERNALLY CONTROLLABLE VARIABLE WIDTH OUTPUT PULSE

[76] Inventor: Pieter M. J. Mulier, 3408 32nd Avenue, N.E., Minneapolis, Minn. 55418

[22] Filed: Aug. 31, 1970

[21] Appl. No.: 68,347

[52] U.S. Cl. ................128/419 P, 128/422, 331/111

[51] Int. Cl. ................A61n 1/36

[58] Field of Search.......128/419 P, 419 R, 421, 422; 331/111

[56] References Cited

UNITED STATES PATENTS

| | | | |
|---|---|---|---|
| 3,528,428 | 9/1970 | Berkovits | 128/419 P |
| 3,311,111 | 5/1967 | Bowers | 128/419 P |
| 2,771,554 | 11/1958 | Gratzl | 128/421 |

FOREIGN PATENTS OR APPLICATIONS

| | | | |
|---|---|---|---|
| 1,444,363 | 5/1966 | France | 128/419 P |

*Primary Examiner*—William E. Kamm
*Attorney*—Lew Schwartz, Thomas G. Devine and Donald R. Stone

[57] ABSTRACT

An implantable cardiac pacer having electrode means adapted to be connected to the hart and electrical circuitry connected to the electrodes for providing hart stimulation pulses. The electrical circuitry includes a pulse generator for providing a timed pulse and means for selectively varying the pulse width. The electrical circuitry also includes means for providing a substantially constant voltage or current output pulse, regardless of change in load impedance. The circuitry is encapsulated in a substance substantially inert to body fluids and tissue, and the means for varying the pulse width is preferably controlled by a nonmechanical contact with a device external to the encapsulating substance.

10 Claims, 2 Drawing Figures

INVENTOR.
PIETER M. J. MULIER
BY
Lew Schwartz
ATTORNEY

CARDIAC PACER WITH EXTERNALLY CONTROLLABLE VARIABLE WIDTH OUTPUT PULSE

BACKGROUND OF THE INVENTION

Implantable cardiac pacers are well known in the art. Many circuits have been devised in an attempt to overcome one of the major problems inherent in such implantable devices, battery drain. If an implantable medical-electrical device is helpful to the patient, then it follows that when the battery has been drained, an entire device must be used to replace the original device, causing great inconvenience and expense. Therefore, it follows that decreasing battery drain, without sacrificing operational safety margins, is a major advantage to be sought by those skilled in the art. Some prior attempts to achieve lower battery drain have included decreasing the output pulse width of the implanted device. However, using this factor alone has led to a decrease in safety margin without significant savings in battery drain.

The apparatus of this invention provides the above sought after advantage of decreased battery drain by providing a combination of variable pulse width, adapted to provide selectable variation on implantation in a patient so that the capture point may be determined and additional safety margin set in, with a constant voltage or current output circuit. It has been found that significant savings in battery drain can be accomplished with this combination.

Another problem with the prior art devices is the troublesome problem of determining when the implanted pacer is close to becoming ineffective, that is, when the battery has become sufficiently low so that the device must soon be replaced. This problem is overcome by the apparatus of this invention by providing a means for the physician to vary the pulse width of an implanted device until capture is lost. As the physician will know the pulse width at which capture was present originally, by varying the pulse width at which capture is lost it can be determined whether the battery has drained to a sufficiently low point so as to make the device replaceable.

SUMMARY OF THE INVENTION

Briefly described, the apparatus of this invention includes encapsulated electrical circuitry providing a constant voltage or current output stimulation pulse with means for varying the pulse width selectively. The electrical circuitry is connected to electrodes adapted to be connected to the portion of the body to be stimulated. Control of the pulse width varying apparatus is preferably from a device external to the encapsulating material, which does not require mechanical contact with the apparatus for varying the pulse width, such as the magnetic potentiometer described in U.S. Pat. No. 3,569,894, issued Mar. 9, 1971. for MAGNETICALLY COUPLED IMPLANTABLE SERVO MECHANISM.

DESCRIPTION OF THE PREFERRED EMBODIMENTS

Figures 1, 2:
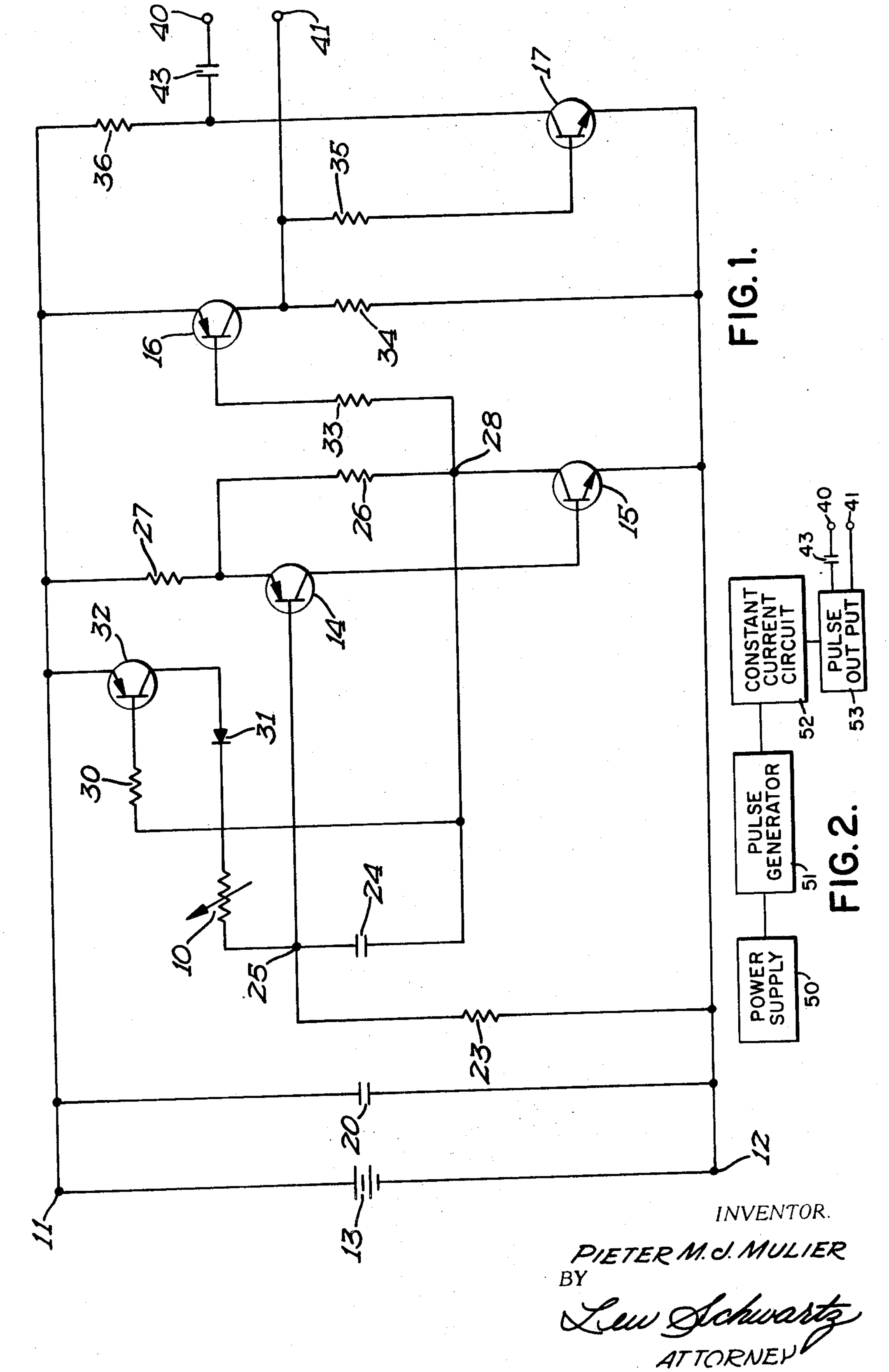
FIG. 1 of the drawing is a schematic diagram of an electrical circuit incorporating the features of the invention described herein.
FIG. 2 is a block diagram of a second embodiment of the invention.

The apparatus represented by the schematic of FIG. 1 is intended to be encapsulated in a substance substantially inert to body fluids and tissue. Such encapsulation is well known to those skilled in the art, and drawings showing such encapsulation have therefore been omitted for the sake of conciseness.

Referring now to the FIG. 1 of the drawing, there is shown a pair of power input terminals 11 and 12. A battery power supply 13, representing one or more batteries, is shown with a positive terminal connected to terminal 11 and a negative terminal connected to terminal 12. A capacitor 20 is connected across supply 13 to stabilize the power supply voltage and reduce the peak power drain on supply 13. A resistor 23 has one end connected to terminal 12 and another end connected to a junction 25. A capacitor 24 is connected between junction 25 and another junction 28. A pair of resistors 26 and 27 are serially connected between junction 28 and terminal 11. A transistor 15 has its emitter connected to terminal 12 and its collector connected to junction 28. A transistor 14 has its collector connected to the base of transistor 15, and its emitter connected to a junction between resistors 26 and 27. The base of transistor 14 is connected to junction 25. A resistor 33 is connected between junction 28 and the base of a transistor 16. Transistor 16 has its emitter connected to terminal 11 and its collector connected to an output terminal 41. A resistor 34 is connected between output terminal 41 and terminal 12, and another resistor 35 is connected between output terminal 41 and the base of a transistor 17. Transistor 17 has an emitter connected to terminal 12 and a collector connected through a resistor 36 to terminal 11. The collector of transistor 17 is also connected to an output capacitor 43 to another output terminal 40. Output terminals 40 and 41 are adapted to be connected to a pair of electrodes which are in turn adapted to be connected to the portion of the body to receive the stimulation output pulse. A transistor 32 has an emitter connected to terminal 11 and a collector connected to junction 25 through a serial combination of a diode 31 and a variable resistance, 10.

Preferably, variable resistance 10 is a magnetic potentiometer operable from a magnetic spinning device controlled external to the body in which the implantable cardiac pacer containing the electrical circuitry of the single FIGURE of the drawings is located. Such a magnetic potentiometer is completely described in the above referenced U.S. Pat. No. 3,569,894.

Excluding the apparatus for varying the pulse width, the circuitry shown is essentially the same as that shown and described in FIG. 7 of U.S. Pat. No. 3,508,167, issued Apr. 21, 1970, to Roger B. Russell, Jr., and assigned to Mennen-Greatbatch Electronics, Inc. As described in the reference patent, the circuit is one which provides substantially constant output pulse width and substantially constant voltage output pulses.

When power from battery 13 is first applied to terminals 11 and 12, capacitor 43 will commence to charge through the circuit comprising battery 13, terminal 11, resistor 36, capacitor 43, out terminal 40 through the heart and back into terminal 41, through resistance 34, and through terminal 12 to battery 13.

This will charge output capacitor 43 with a positive polarity on its left-hand terminal.

At the same time, capacitor 24 will commence to charge through the paths comprising battery 13, terminal 11, resistors 27 and 26, junction 28 through capacitor 24 to junction 25, and through resistor 23 and terminal 12 to battery 13. This will cause the upper electrode of capacitor 24 to become negative with regard to its lower electrode, and as the charge builds this will cause a forward bias between the emitter base junction of transistor 14 to turn it on. When transistor 14 turns on the resultant current flow through its collector will be felt on the base of transistor 15 to sharply turn it on causing junction 28 to go to substantially the negative potential of supply 13.

The negative potential at junction 28 will be felt through resistor 33 to turn on transistor 16, thus sending its collector to substantially the positive voltage of power supply 13. This positive voltage on the collector of transistor 16 will be felt through resistor 35 on the base of transistor 17 to turn it on, causing its emitter to go to substantially a negative voltage of supply 13. Thus it is apparent that terminal 41 will be raised to substantially the positive voltage level of supply 13, while the left-hand terminal of capacitor 43 will be connected through transistor 17 to substantially the negative voltage level of supply 13, thus placing supply 13 essentially in series with the voltage stored in capacitor 43, causing a voltage doubling effect on output terminals 40 and 41. Capacitor 43 will then discharge through the path comprising the left-hand electrode of capacitor 43, transistor 17, terminal 12 through battery 13 and terminal 11, through transistor 16 and out through junction 41, through the heart and in through junction 40 to the left-hand terminal of capacitor 43.

At the same time the negative voltage appears at junction 28 to commence the output stimulation pulse, it will be felt through resistor 30 on the base of transistor 32 to turn it on. The result will be a discharge path for capacitor 24 comprising the lower plate of capacitor 24, junction 28, transistor 15, through terminal 12 and battery 13 to terminal 11, through transistor 32, diode 31 and variable resistor 10 to junction 25 and finally to the upper plate of capacitor 24. This current flow will continue until the base-emitter junction of transistor 14 is no longer biased on, thus turning off transistor 14 to in turn shut off transistor 15. The resulting increase of potential at junction 28 will cause all the remaining transistors to turn off, thus shutting off the output pulse.

It therefore becomes apparent that the output pulse width is determined by the length of time it takes capacitor 24 to discharge. By placing variable resistor 10 in series with capacitor 24, the R-C time period can be adjusted to vary the pulse width. It has been found preferable to provide for a pulse width variance of approximately 0.3 to 3 milliseconds.

FIG. 2 is a block diagram of a second embodiment to the apparatus of this invention in which the pulse width is varied with a constant current level. There is shown a power supply 50, a pulse generator 51, a constant current circuit 52 and a pulse output circuit 53. Terminal 40 is connected through a capacitor 43 to circuit 53 and terminal 41 is also shown connected to circuit 53. The general operation of the circuitry of FIG. 2 is the same as that of FIG. 1, except that constant current circuit 52 provides that the output stimulation pulses appearing at terminals 40 and 41 will be at a constant current level rather than the constant voltage level of the circuitry of FIG. 1.

Studies and testing of the apparatus of this invention indicate that the energy consumed by the heart is not increased in linear proportion to the increase of energy supplied by the implanted cardiac pacer. This is apparently primarily due to the complex impedance which the heart represents as a load to the pacer, and to polarization effects at the electrode and the electrode interfaces with the heart. In tests employing constant voltage output pulses, and constant current output pulses, it has been found that the energy used by the heart is substantially the same over a wide range of energy provided by the implanted circuitry. Therefore, it becomes apparent that by keeping the output pulse voltage constant and varying the pulse width (or keeping the output pulse current constant and varying the pulse width) the output energy can be varied to provide for minimum battery drain while still providing capture with sufficient safety margin. This is made more apparent by the following four tables showing test results on pacers in dogs. In the tables, PW is pulse width in milliseconds, $V_{PM}$ is constant voltage pulse value in volts, $I_{PM}$ is constant current pulse value in milliamps, $E_h$ is the energy used by the heart muscle in microjoules, $E_c$ is energy lost in tissue-electrode interfact polarization in microjoules, and $E_{PM}$ is the total energy delivered by the pacer in microjoules.

TABLE I

CONSTANT VOLTAGE BIPHASIC PULSE-UNIPOLAR MYOCARDIAL ELECTRODES

| | | | | | | | | |
|---|---|---|---|---|---|---|---|---|
| PW | 0.25 | 0.50 | 0.80 | 1.00 | 1.25 | 1.50 | 2.00 | 3.00 |
| $V_{PM}$ | 2.37 | 1.51 | 1.17 | 1.05 | 0.95 | 0.91 | 0.84 | 0.75 |
| $E_h$ | 3.10 | 2.28 | 1.98 | 1.88 | 1.80 | 1.85 | 1.91 | 1.99 |
| $E_c$ | 0.20 | 0.22 | 0.32 | 0.37 | 0.42 | 0.50 | 0.60 | 0.75 |
| $E_{PM}$ | 3.30 | 2.50 | 2.30 | 2.25 | 2.22 | 2.35 | 2.51 | 2.74 |

TABLE II

CONSTANT VOLTAGE BIPHASIC PULSE-BIPOLAR MYOCARDIAL ELECTRODES

| | | | | | | | | |
|---|---|---|---|---|---|---|---|---|
| PW | 0.25 | 0.50 | 0.80 | 1.00 | 1.25 | 1.50 | 2.00 | 3.00 |
| $V_{PM}$ | 2.92 | 1.85 | 1.47 | 1.34 | 1.23 | 1.17 | 1.14 | 1.04 |
| $E_h$ | 3.76 | 2.53 | 2.25 | 2.05 | 2.01 | 2.01 | 2.26 | 2.32 |
| $E_c$ | 0.32 | 0.35 | 0.53 | | 0.70 | 0.77 | 1.02 | 1.19 |
| $E_{PM}$ | 4.08 | 2.88 | 2.78 | 2.69 | 2.71 | 2.78 | 3.28 | 3.51 |

TABLE III

CONSTANT CURRENT BIPHASIC PULSE-UNIPOLAR MYOCARDIAL ELECTRODES

| | | | | | | | | |
|---|---|---|---|---|---|---|---|---|
| PW | 0.25 | 0.50 | 1.80 | 1.00 | 1.25 | 1.50 | 2.00 | 3.00 |
| $I_{PM}$ | 5.02 | 3.04 | 2.20 | 1.89 | 1.66 | 1.59 | 1.33 | 1.06 |
| $E_h$ | 2.36 | 1.78 | 1.52 | 1.40 | 1.35 | 1.28 | 1.25 | 1.15 |
| $E_c$ | 0.24 | 0.30 | 0.37 | 0.39 | 0.45 | 0.48 | 0.60 | 0.76 |

| | | | | | | | | |
|---|---|---|---|---|---|---|---|---|
| $E_{PM}$ | 2.60 | 2.08 | 1.89 | 1.79 | 1.80 | 1.76 | 1.85 | 1.91 |

TABLE IV

CONSTANT CURRENT BIPHASIC PULSE-BIPOLAR MYOCARDIAL ELECTRODES

| | | | | | | | | |
|---|---|---|---|---|---|---|---|---|
| PW | 0.25 | 0.50 | 0.80 | 1.00 | 1.25 | 1.50 | 2.00 | 3.00 |
| $I_{PM}$ | 4.87 | 2.85 | 2.05 | 1.78 | 1.55 | 1.36 | 1.15 | 0.96 |
| $E_h$ | 2.75 | 1.95 | 1.58 | 1.48 | 1.37 | 1.30 | 1.27 | 1.21 |
| $E_c$ | 0.33 | 0.43 | 0.54 | 0.60 | 0.69 | 0.72 | 0.84 | 1.20 |
| $E_{PM}$ | 3.08 | 2.38 | 2.12 | 2.08 | 2.06 | 2.02 | 2.11 | 2.41 |

In practice of operation of the preferred embodiment, the doctor can implant the heart stimulating device and connect the electrodes to the heart. Then, variable resistor 10 can be varied to selectively vary the pulse width of the pulse provided at terminals 40 and 41 to the electrodes connected to the heart. Through well known monitoring circuitry, the physician can determine when the pulse width is sufficient to provide for capture, and he can then set in a safety margin (for example a factor of pulse width of 3), as desired.

At a later time in the patient's history, the physician can determine whether the battery of the pacer has become sufficiently low so that the device must soon be replaced. As the physician will know the pulse width at which capture was present originally, by varying the pulse width at which capture is lost it can be determined whether the battery has drained to a sufficiently low point so as to make the device replaceable.

Thus, the apparatus of this invention provides two major advantages in the field of medical-electronics, and it will be apparent that embodiments other than that shown, such as a constant current embodiment, can be used without departing from the spirit of the invention.

What is claimed is:

1. In an implantable cardiac pacer, including electrical circuit means for providing stimulation pulses to electrode means adapted to be connected to a heart, the circuitry encapsulated in means substantially inert to body fluids and tissue, the improvement comprising: remotely controllable first means connected to the electrical circuit means for selectively varying the width of the stimulation pulses from values sufficient to achieve cardiac capture to values at which cardiac capture is lost; the electrical circuit means including second means for providing the stimulation pulses at a generally constant level; said first and second means encapsulated in the means substantially inert to body fluids and tissue; and further means external to the means substantially inert to body fluids and tissue for varying the remotely controllable first means.

2. The apparatus of claim 1 in which the further means and the first means include means for producing magnetic coupling therebetween.

3. The apparatus of claim 1 in which the second means is for providing the stimulation pulses at a generally constant current.

4. The apparatus of claim 1 in which the second means is for providing stimulation pulses at a generally constant voltage.

5. An improved implantable medical-electrical apparatus comprising: electrical circuit means for providing timed stimulation pulses to electrode means adapted to be connected to a portion of a body in which the apparatus is implanted; the electrical circuit means including pulse generator means having timing circuit means for controlling stimulation pulse width and rate; the timing circuit means including a portion having remotely controllable selectively variable electrical characteristics for selectively varying the stimulation pulse width from values sufficient to achieve cardiac capture to values at which cardiac capture is lost; means adapted to be placed external to the body for selectively varying the electrical characteristics of the portion of the timing circuit means; and the electrical circuit means including further circuit means for maintaining the stimulation pulses at a substantially constant voltage level.

6. The apparatus of claim 5 in which the further circuit means is for maintaining the stimulation pulses at a substantially constant current level.

7. The apparatus of claim 5 in which the timing circuit means comprises R-C time constant means.

8. The apparatus of claim 7 in which the portion of the timing circuit means comprises variable resistance means.

9. The apparatus of claim 8 in which the variable resistance means and the means external to the body include means for producing magnetic coupling therebetween.

10. In an implantable cardiac pacer, including electrical circuit means for providing stimulation pulses to electrode means adapted to be connected to a heart, the circuitry encapsulated in means substantially inert to body fluids and tissue, the improvement comprising: remotely controllable means connected to the electrical circuit means for selectively varying the width of the stimulation pulses; the electrical circuit means including second means for providing the stimulation pulses at a generally constant level; the remotely controllable means having a range for varying the width of the stimulation pulses for varying the energy of the pulses from magnitudes sufficient to achieve cardiac capture to magnitudes below the cardiac capture level; said remotely controllable and second means encapsulated in the means substantially inert to body fluids and tissue; and further means external to the means substantially inert to body fluids and tissue for varying the remotely controllable means.

* * * * *